US007864070B2

(12) United States Patent
Witkowski et al.

(10) Patent No.: US 7,864,070 B2
(45) Date of Patent: Jan. 4, 2011

(54) SYSTEM AND METHOD FOR TRAINING A TRAINABLE TRANSMITTER

(75) Inventors: Todd R. Witkowski, Zeeland, MI (US); Jason L. Reene, Holland, MI (US)

(73) Assignee: Johnson Controls Technology Company, Holland, MI (US)

( * ) Notice: Subject to any disclaimer, the term of this patent is extended or adjusted under 35 U.S.C. 154(b) by 657 days.

(21) Appl. No.: 11/086,268

(22) Filed: Mar. 22, 2005

(65) Prior Publication Data

US 2006/0214813 A1 Sep. 28, 2006

(51) Int. Cl.
*H04Q 1/00* (2006.01)
*G05B 19/00* (2006.01)

(52) U.S. Cl. ............. 340/825.69; 340/5.25; 340/825.22

(58) Field of Classification Search ............ 340/825.69, 340/3.9, 5.25, 825.7, 825.71, 426.14
See application file for complete search history.

(56) References Cited

U.S. PATENT DOCUMENTS

| | | | | |
|---|---|---|---|---|
| 3,723,876 | A * | 3/1973 | Seaborn, Jr. | 455/18 |
| 6,021,319 | A | 2/2000 | Tigwell | |
| 6,091,343 | A * | 7/2000 | Dykema et al. | 340/825.69 |
| 6,181,255 | B1 * | 1/2001 | Crimmins et al. | 340/825.69 |
| 2005/0024230 | A1 * | 2/2005 | Chuey | 340/825.72 |
| 2006/0181428 | A1 * | 8/2006 | Blaker et al. | 340/825.22 |

FOREIGN PATENT DOCUMENTS

| | | | |
|---|---|---|---|
| EP | 0 926 648 | A2 | 6/1999 |
| WO | WO 2006/102463 | A2 | 9/2006 |

OTHER PUBLICATIONS

PCT International Search Report, based on International Application No. PCT/US2006/010494, date of mailing of the International Search Report Oct. 24, 2006 (3 total pages).

Written Opinion for International Patent Application No. PCT/US2006/010494, dated Sep. 22, 2007, 5 pages.

* cited by examiner

*Primary Examiner*—Brian A Zimmerman
*Assistant Examiner*—Yong Hang Jiang
(74) *Attorney, Agent, or Firm*—Foley & Lardner LLP

(57) ABSTRACT

A method for training a trainable transmitter in a vehicle includes receiving a request to enter a training mode of the trainable transmitter from a user. In response to the request, default mode data is retrieved from a memory and transmitted for a predetermined time. Upon expiration of the predetermined time, the trainable transmitter begins a training mode.

21 Claims, 3 Drawing Sheets

SYSTEM AND METHOD FOR TRAINING A TRAINABLE TRANSMITTER

FIELD OF THE INVENTION

The present invention relates generally to the field of trainable transmitters and transceivers for use with vehicles. More specifically, the present invention relates to trainable transmitters and transceivers that are configured for use with remote control systems.

BACKGROUND OF THE INVENTION

Electronically operated remote control systems, such as garage door opener systems, home security systems, home lighting systems, gate controllers, etc., typically employ a portable, hand-held transmitter (i.e., an original transmitter) to transmit a control signal to a receiver located at the remote control system. For example, a garage door opener system typically includes a receiver located within a home owner's garage and coupled to the garage door opener. A user presses a button on the original transmitter to transmit a radio frequency signal to the receiver to activate the garage door opener to open and close a garage door. Accordingly, the receiver is tuned to the frequency of its associated original transmitter and demodulates a predetermined code programmed into both the original transmitter and the receiver for operating the garage door. To enhance security of wireless control systems, such as a garage door opener system, manufacturers commonly use encryption technology to encrypt the radio frequency signal sent from a transmitter to a receiver. One such encryption method is a rolling code system, wherein each digital message sent from the transmitter to the receiver has a different code from the previous digital message.

As an alternative to a portable, hand-held original transmitter, a trainable transmitter or transceiver may be provided in a vehicle for use with remote control systems. A trainable transmitter is configurable by a user to activate one or more of a plurality of different remote control system receivers using different radio frequency messages. A user may train the trainable transmitter to an existing original transmitter by holding the two transmitters in close range and pressing buttons on the original transmitter and the trainable transmitter. The trainable transmitter identifies the type of wireless control system associated with the original transmitter based on a radio frequency signal received from the original transmitter. For example, the trainable transmitter may identify and store the control code and RF carrier frequency of the original transmitter radio frequency control signal. In addition, the receiver of the remote control system must learn a transmitter identifier of the trainable transmitter. For systems employing a rolling code (or other encryption method), the trainable transmitter and receiver must be "synchronized" so that the counters of the trainable transmitter and the receiver begin at the same value. Accordingly, the user presses a button on the receiver to put the receiver in a training mode. A button on the trainable transmitter may then be pressed, for example, two to three times, to transmit messages so the receiver may learn the transmitter identifier, complete synchronization of the receiver and the trainable transmitter and confirm that training was successful. Once trained, the trainable transmitter may be used to transmit RF signals to control the remote control system.

As mentioned, a trainable transmitter or transceiver may be trained to one or more of a plurality of remote control systems using different radio frequency messages. Accordingly, a trainable transmitter may include multiple channels where each channel may be trained to a different radio frequency control signal. During manufacture of a trainable transmitter, a manufacturer may program the channels of the trainable transmitter with default mode data (e.g., a default control signal or rolling code) and an appropriate frequency or frequencies so that the operation of the trainable transmitter may be tested after final assembly. The default mode data may be, for example, generic control data (fixed or rolling code) or control data for a particular type of remote control system (e.g., a fixed code garage door opener system) that is pre-stored in the trainable transmitter for testing of the trainable transmitter. In addition, an automobile manufacturer may wish to test the trainable transmitter during vehicle manufacture using the default mode data. The trainable transmitter is tested by transmitting the default mode data to a default mode receiver (e.g., a generic receiver or an appropriate receiver corresponding to the pre-stored control data) in close range to the trainable transmitter. If the channels are not cleared before shipping the trainable transmitter (e.g., either to an automobile OEM or in a vehicle to a customer), the training process for a trainable transmitter often includes a first step of having the user clear each channel of the trainable transmitter of the default mode data before placing the trainable transmitter in a training mode to be trained to the user's remote control system. This additional step may be cumbersome and inconvenient for a user. In addition, if the user does not clear the channels of default data, the trainable transmitter may not train properly.

SUMMARY OF THE INVENTION

In accordance with an embodiment, a method for training a trainable transmitter in a vehicle includes receiving a request to enter a training mode of the trainable transmitter from a user, retrieving default mode data from a memory, transmitting the default mode data for a predetermined time, and upon expiration of the predetermined time, beginning a training mode of the trainable transmitter.

In accordance with another embodiment, a trainable transmitter includes a user input device, a memory having pre-stored control data associated with at least one channel of the trainable transmitter, a transmitter circuit configured to generate and transmit signals, and a control circuit coupled to the user input device, memory and transmitter circuit, the control circuit configured to retrieve the pre-stored control data from memory in response to actuation of the user input device and to provide the pre-stored control data to the transmitter circuit, where the transmitter circuit is further configured to transmit the pre-stored control data for a predetermined time before entering a training mode In accordance with yet another embodiment, a method for training a trainable transmitter in a vehicle includes receiving a request to enter a training mode of the trainable transmitter from a user, retrieving pre-stored control data from a memory, transmitting the pre-stored control data for a predetermined time, and upon expiration of the predetermined time, beginning a training mode of the trainable transmitter.

DETAILED DESCRIPTION OF THE PREFERRED EMBODIMENTS

A system and method for training a trainable transmitter is provided in which prior to entering a training mode, the trainable transmitter is configured to retrieve default mode data (e.g., pre-stored control data) from memory and to transmit the default mode data for a predetermined period of time. The default mode data may be pre-stored in the trainable transmitter and associated with the channels of the trainable transmitter for testing the trainable transmitter during an assembly process.

Figure 1:
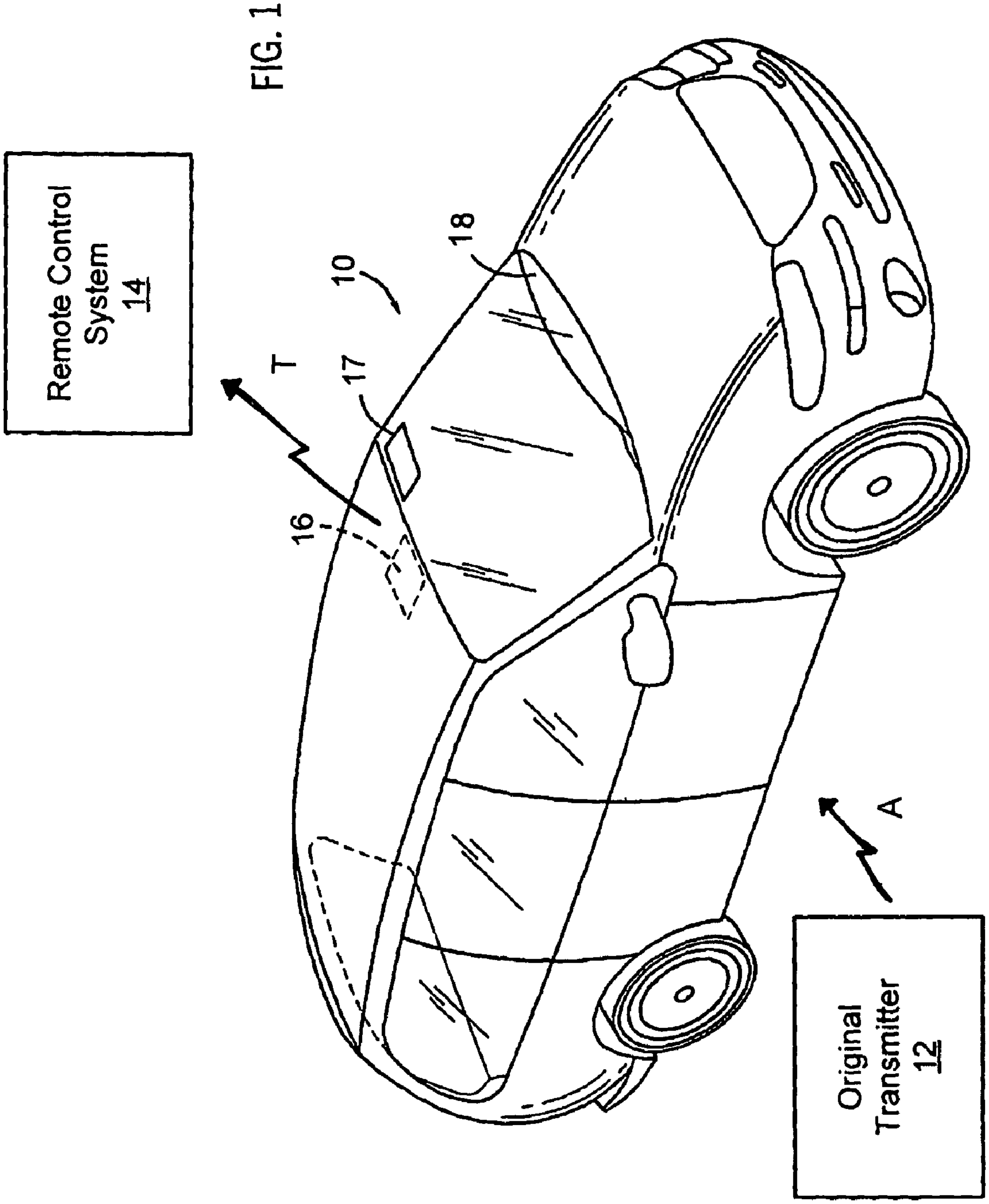
FIG. 1 is a perspective view of a vehicle having a trainable transmitter in accordance with an embodiment.

FIG. 1 is a perspective view of a vehicle including a trainable transmitter in accordance with an embodiment. A vehicle 10, which may be an automobile, truck, sport utility vehicle (SUV), mini-van, or other vehicle, includes a trainable transmitter 16. In alternative embodiments, a trainable transmitter may be embodied in other systems such as a portable housing, key fob, key chain or other hand-held device. In FIG. 1, trainable transmitter 16 is illustrated mounted to an overhead console of vehicle 10. Alternatively, one or more of the elements of trainable transmitter 16 may be mounted to other vehicle interior elements such as a visor 17, an instrument panel 18, a rearview mirror (not shown), a dashboard, seat, center console, door panel, or other appropriate location in the vehicle.

Trainable transmitter 16 may be configured to control a remote control system 14, such as a garage door opener, home security system, home lighting system, gate controller, etc. Trainable transmitter 16 is trained using an original transmitter 12 used to control remote control system 14. Original transmitter 12 is a transmitter, typically a hand-held transmitter, which is sold with remote control system 14 or as an after-market item, and which is configured to transmit an activation signal at a predetermined carrier frequency and having control data configured to actuate remote control system 14. For example, original transmitter 12 can be a hand-held garage door opener transmitter configured to transmit a garage door opener signal at a frequency, such as 355 Megahertz (MHz), wherein the activation signal has control data, which can be fixed code or cryptographically-encoded code (e.g., a rolling code). In this example, remote control system 14 may be a garage door opener system configured to open a garage door in response to receiving the activation signal from original transmitter 12. Accordingly, remote control system 14 includes an antenna (not shown) for receiving wireless signals including control data which would control remote control system 14.

To train trainable transmitter 16, an activation or control signal A is transmitted from original transmitter 12 to trainable transmitter 16 in the vehicle 10. Trainable transmitter 16 receives the control signal, identifies the control data (e.g., fixed or rolling code data) and carrier frequency of the control signal and stores this information for later retransmission. Trainable transmitter 16 may then be used to selectively generate and transmit a control signal T with the learned frequency and control data to the remote control system 14, such as a garage door opener, that is responsive to the control signal. The training and operation of trainable transmitter 16 is discussed in further detail below.

Figure 2:
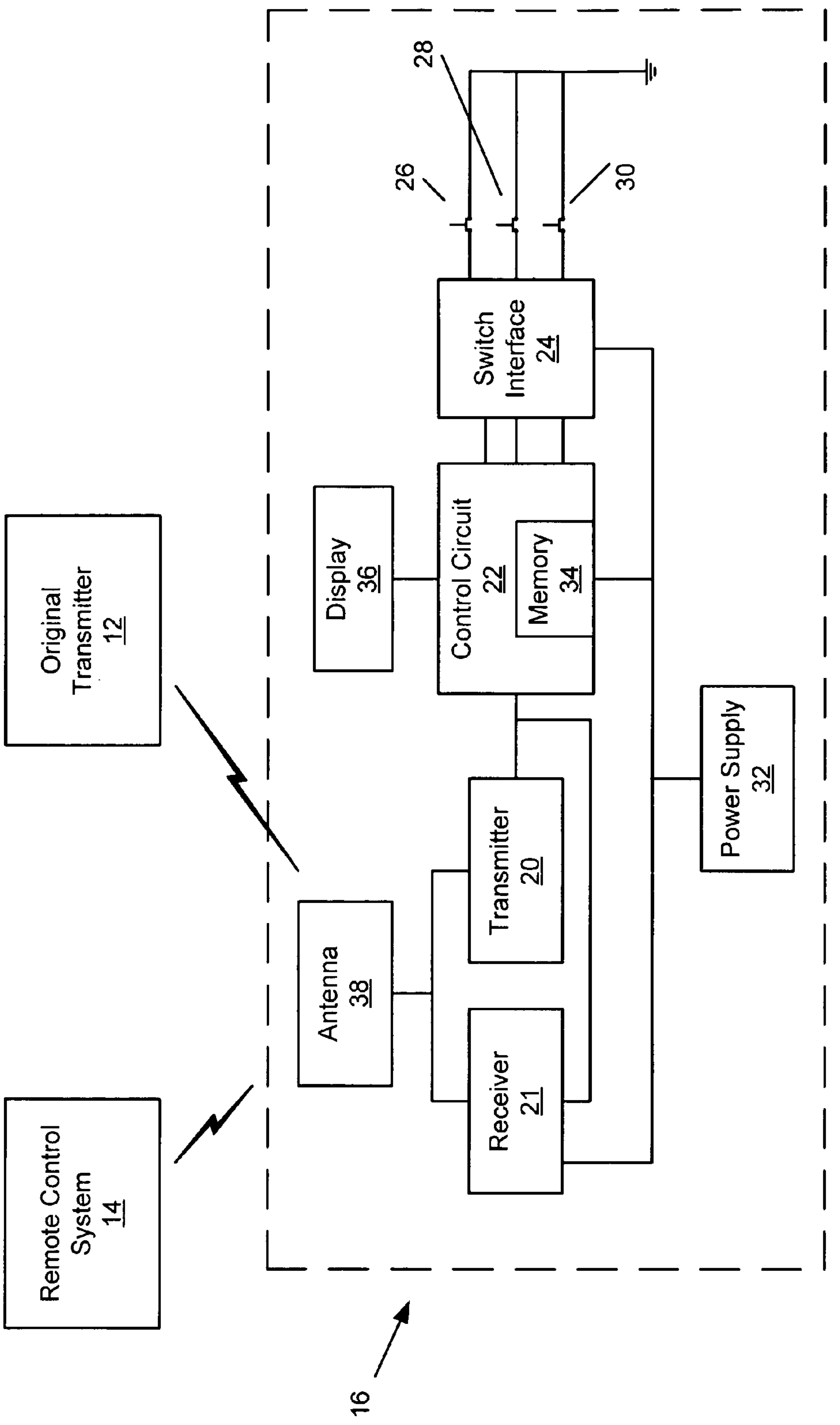
FIG. 2 is a schematic block diagram of a trainable transmitter in accordance with an embodiment.

FIG. 2 is a schematic block diagram of a trainable transmitter in accordance with an embodiment. Trainable transmitter 16 includes a transmitter circuit 20 and a receiver 21 that are coupled to an antenna 38. In another embodiment, a single dual function transceiver having transmit and receive circuitry may be provided in place of a separate receiver and transmitter. Transmitter circuit 20 and receiver 21 are also coupled to a control circuit 22. Control circuit 22 may include various types of control circuitry, digital and/or analog, and may include a microprocessor, microcontroller, application specific integrated circuit (ASIC), or other digital and/or analog circuitry configured to perform various input/output, control, analysis, and other functions to be described herein. A switch interface 24 is coupled to a plurality of buttons or switches. In an exemplary embodiment, switch interface 24 is coupled to one terminal of each of three push button switches 26, 28 and 30, which have their remaining terminal connected to ground. Switches 26, 28 and 30 may each be associated with a separate remote control system to be controlled, each of which may have its own unique operating RF frequency, modulation scheme, and/or control data. Thus, switches 26, 28 and 30 each correspond to a different radio frequency channel for transmitter circuit 20. It should be understood, however, that each channel may be trained to the same original transmitter, if desired, or to different original transmitters.

Interface circuit 24 couples signal information from switches 26, 28 and 30 to the input terminals of control circuit 22. Control circuit 22 includes data input terminals for receiving signals from the switch interface 24 indicative of the closure states of switches 26, 28 and 30. A power supply 32 is conventionally coupled to the various components for supplying the necessary operating power in a conventional manner.

Control circuit 22 is also coupled to a display 36 which includes a display element such as a light emitting diode (LED). Display 36 may also include a liquid crystal display (LCD), a vacuum fluorescent display (VFD), or other display elements. Control circuit 22 includes a memory 34 including volatile and non-volatile memory to, for example, store a computer program or other software to perform the functions described herein. Memory 34 is also configured to store learned information such as control data and carrier frequency information that may be associated with switches 26, 28 and 30. In addition, for rolling code or other cryptographically encoded remote control systems, information regarding rolling code or cryptographic algorithms may be pre-stored and associated with frequencies and control data that may be used to identify a particular type of remote control system and, therefore, the appropriate cryptographic algorithm for the remote control system. As discussed previously, each switch or button 26, 28 and 30 may be associated with a separate remote control system, such as different garage door openers, electronically operated access gates, house lighting controls and other remote control systems, each which may have its own unique operating RF frequency, modulation scheme and control data. Before the channels associated with switches 26, 28 and 30 are trained to a specific remote control system, memory 34 is configured to store default mode data or control data (e.g., a default control signal, rolling code, fixed code, modulation scheme, etc.) which may be associated with a channel or channels of the trainable transmitter and used to test trainable transmitter 16 during assembly and manufacture. Default mode data may be, for example, generic control data or control data for a particular type of remote control system (e.g., a garage door opener system of a particular manufacturer that is used for testing the trainable transmitter). For example, after final assembly, a switch 26 may be actuated to cause control circuit 22 and transmitter circuit 20 to generate a test signal using the pre-stored default mode data and transmit the test signal to a default mode receiver (not shown). The default mode receiver is a receiver configured to receive and be controlled by the default mode data.

Transmitter circuit 20 and receiver 21 communicate with the remote control system 14 and the original transmitter 12 via antenna 38. Receiver 21 may be used to receive signals via antenna 38 and transmitter circuit 20 may be used to transmit signals via antenna 38. In an alternative embodiment, a separate antenna may be used with transmitter 20 and with receiver 21 (e.g., separate transmit and receive antennas may be provided in the trainable transmitter). Once a channel of trainable transmitter 16 has been trained, trainable transmitter 16 is configured to transmit a wireless control signal having control data which will control remote control system 14. For example, in response to actuation of a switch, such as switch 26, transmitter circuit 20 is configured, under control from control circuit 22, to generate a control signal having the carrier frequency and control data associated with the particular trained channel. The control data may be modulated onto the control signal using, for example, frequency shift key (FSK) modulation, amplitude shift key (ASK) modulation or other modulation technique. The control data on the control signal may be a fixed code or a rolling code or other cryptographically encoded control code suitable for use with remote control system 14. As mentioned previously, trainable transmitter 16 may learn the control code and carrier frequency for remote control system using original transmitter 12 for remote control system 14.

Figure 3:
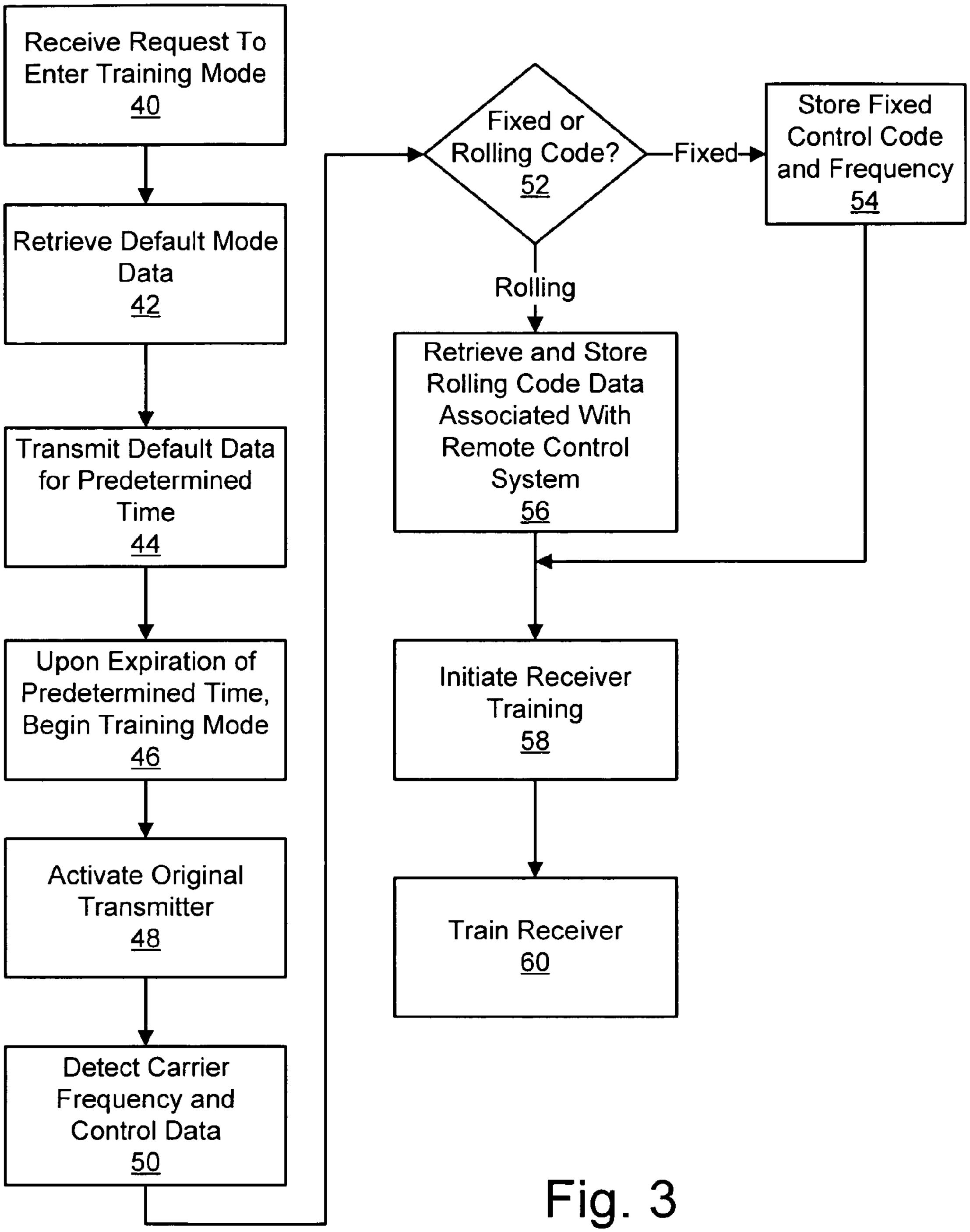
FIG. 3 illustrates a method for training a trainable transmitter in accordance with an embodiment.

FIG. 3 illustrates a method for training a trainable transmitter in accordance with an embodiment. At block 40, a request to enter a training mode is received from a user at the trainable transmitter. For example, a user may provide a request by actuating an untrained pushbutton (e.g., pushbutton 26 in FIG. 2) of the trainable transmitter. In one embodiment, the user holds the pushbutton until feedback is provided that the training of the channel is complete. Alternatively, the user may hold the pushbutton for a predetermined amount of time (e.g., 3 seconds, 10 seconds, etc.). A display may be used to indicate to the user that a training mode was initiated, for example, a display element such as an LED indicator may flash to provide feedback to a user. In addition, the display element may be used to indicate that the channel is trained (e.g., an LED may flash rapidly). In alternative embodiments, a request to enter a training mode may be provided by a combination of key presses using input devices of the trainable transmitter, by receiving a message on a vehicle bus, upon receipt of a control signal from the original transmitter or by selecting a menu item on a display. At block 42, default mode data (or pre-stored control data) is retrieved from memory and used to generate a signal having the default mode data. At block 44, the signal having the default mode data is transmitted by the trainable transmitter for a predetermined amount of time (e.g., 0.5-1.0 seconds). A counter may be used to track the length of time the default mode data is transmitted. Upon expiration of the predetermined amount of time, the trainable transmitter enters a training mode at block 46 and begins looking for a control signal to train the channel. In an exemplary embodiment, an original transmitter is brought within the vicinity of the trainable transmitter and activated to send an RF control signal at block 48 (e.g., a user input device of the original transmitter is actuated). At block 50, the trainable transmitter detects the carrier frequency and control data of the control signal from the original transmitter. For example, the trainable transmitter may receive the control signal from the original transmitter, demodulate the control signal and identify the control data and carrier frequency of the control signal. The carrier frequency and control data may be used to determine the type of remote control system associated with the original transmitter and whether the control data is fixed or rolling code.

At block 52, if the remote control system is a fixed code system, the fixed code and carrier frequency are stored in memory at block 54 for later retransmission during an operating mode of the trainable transmitter. If the control signal is a rolling code, at step 56, rolling code data (e.g., a rolling code algorithm and a carrier frequency) is retrieved from memory based on the identified type of remote control system and associated with the channel being trained. Once the trainable transmitter channel is trained, a user initiates a training mode for the receiver of the remote control system at block 58. For example, a user may actuate an input device such as a button coupled to the receiver. At block 60, the receiver is trained by, for example, learning an identifier of the trainable transmitter and, for a rolling code system, synchronizing the counters of the trainable transmitter and receiver. In an exemplary embodiment, a button on the trainable transmitter may be pressed, for example, two to three times, to transmit signals from the trainable transmitter to the receiver so that the receiver may learn the transmitter identifier, complete the synchronization of the receiver and trainable transmitter and confirm the training was successful. As mentioned previously, once trained, the trainable transmitter may be used to transmit control signals to control the remote control system.

While the exemplary embodiments illustrated in the FIGS. and described above are presently preferred, it should be understood that these embodiments are offered by way of example only. For example, alternative embodiments may be suitable for use in the commercial market, wherein office lights or security systems or parking garage doors are controlled. Accordingly, the present invention is not limited to a particular embodiment, but extends to various modifications that nevertheless fall within the scope of the appended claims.

What is claimed is:

1. A method of using a trainable transmitter in a vehicle, the method comprising:

receiving a request to enter a training mode from a user via input electronics of the trainable transmitter, wherein the training mode is configured to train processing electronics associated with the input electronics, wherein the processing electronics are untrained;

retrieving default mode data from a memory in response to the request, wherein the memory and the default mode data are associated with the input electronics;

transmitting the retrieved default mode data for a predetermined time;

upon expiration of the predetermined time, beginning the training mode of the trainable transmitter to train the processing electronics; and storing data associated with a control signal from an original transmitter in the memory while in the training mode.

2. A method according to claim 1, wherein the default mode data includes default control data.

3. A method according to claim 1, wherein the training mode of the trainable transmitter comprises:

receiving the control signal from the original transmitter associated with a remote control system; and detecting a frequency and control data of the control signal.

4. A method according to claim 3, wherein the training mode further comprises:

identifying a type of remote control system based on the frequency and control data of the control signal; and storing the frequency and control data.

5. A method according to claim 1, wherein the trainable transmitter is integrated into a vehicle interior element.

6. A method according to claim 3, wherein the control data of the control signal is fixed code data.

7. A method according to claim 3, wherein the control data of the control signal is rolling code data.

8. A method according to claim 1, wherein the trainable transmitter is a transceiver.

9. A method according to claim 1, wherein input electronics include a pushbutton.

10. A trainable transmitter, comprising:

a user input device;

a memory having pre-stored control data associated with the user input device;

a transmitter circuit associated with the user input device and configured to generate and transmit signals in response to actuation of the user input device, wherein the transmitter circuit is untrained; and a control circuit coupled to the user input device, the memory and the transmitter circuit, the control circuit configured to retrieve the pre-stored control data from the memory in response to actuation of the user input device and to provide the pre-stored control data to the transmitter circuit;

wherein the transmitter circuit is further configured to enter a training mode after the pre-stored control data is transmitted for a predetermined time, while in training mode the control circuit is configured to cause the memory to store data associated with a control signal from an original transmitter.

11. A trainable transmitter according to claim 10, wherein the trainable transmitter is a transceiver.

12. A trainable transmitter according to claim 10, wherein the user input device is a pushbutton.

13. A trainable transmitter according to claim 10, wherein the pre-stored control data is fixed code data.

14. A trainable transmitter according to claim 10, wherein the transmitter circuit generates a signal using the pre-stored control data.

15. A trainable transmitter according to claim 10, wherein the trainable transmitter is integrated into a vehicle interior element.

16. A trainable transmitter according to claim 10, wherein the pre-stored control data is rolling code data.

17. A method of using a trainable transmitter in a vehicle, the method comprising:

receiving a request to enter a training mode from a user via input electronics of the trainable transmitter, wherein the training mode is configured to train a channel of the trainable transmitter, wherein the channel is untrained;

retrieving pre-stored control data from a memory in response to the request, wherein the pre-stored control data is associated with the channel of the trainable transmitter;

transmitting the pre-stored control data for a predetermined time;

upon expiration of the predetermined time, beginning the training mode of the trainable transmitter to train the channel; and storing data associated with a control signal from an original transmitter in the memory while in training mode.

18. A method according to claim 17, wherein the trainable transmitter is a transceiver.

19. A method according to claim 17, wherein the request to enter a training mode is received via a pushbutton.

20. A method according to claim 17, wherein the trainable transmitter is integrated into a vehicle interior element.

21. The trainable transmitter of claim 15, wherein the vehicle interior element is a mirror.

* * * * *